(12) United States Patent
Kannan et al.

(10) Patent No.: US 7,214,739 B2
(45) Date of Patent: May 8, 2007

(54) COMPOSITION AND METHOD FOR IMPROVING THE SURFACE ADHESION OF RESIN COMPOSITIONS TO POLYURETHANE FOAM

(75) Inventors: Ganesh Kannan, Bangalore (IN); Vijay Ramchandra Mhetar, Slingerlands, NY (US); Mark Denniston, Altamont, NY (US); Mark Lewis, Coxsackle, NY (US)

(73) Assignee: General Electric Company, Schenectady, NY (US)

( * ) Notice: Subject to any disclaimer, the term of this patent is extended or adjusted under 35 U.S.C. 154(b) by 381 days.

(21) Appl. No.: 10/420,974

(22) Filed: Apr. 22, 2003

(65) Prior Publication Data

US 2004/0214952 A1 Oct. 28, 2004

(51) Int. Cl.
*C08G 65/00* (2006.01)
(52) U.S. Cl. .................. 525/133; 525/132; 525/133; 524/611; 524/178
(58) Field of Classification Search ............. 525/92 D, 525/132, 133; 524/508, 540, 611, 178
See application file for complete search history.

(56) References Cited

U.S. PATENT DOCUMENTS

| | | | |
|---|---|---|---|
| 2,182,306 A | 12/1939 | Ulrich et al. | |
| 2,208,095 A | 7/1940 | Esselmann et al. | |
| 2,553,696 A | 5/1951 | Wilson et al. | |
| 2,792,372 A | 5/1957 | Dickson et al. | |
| 2,806,839 A | 9/1957 | Crowther et al. | |
| 3,033,746 A | 5/1962 | Moyle et al. | |
| 4,054,553 A * | 10/1977 | Olander | 528/215 |
| 4,123,474 A * | 10/1978 | Katchman | 524/147 |
| 4,385,168 A * | 5/1983 | Ueno et al. | 528/215 |
| 4,491,649 A * | 1/1985 | Falk et al. | 525/92 D |
| 4,665,112 A * | 5/1987 | Berdahl | 524/111 |
| 4,713,416 A | 12/1987 | DelGuidice et al. | |
| 4,764,559 A | 8/1988 | Yamauchi et al. | |
| 4,844,320 A | 7/1989 | Stokes et al. | |
| 4,863,984 A * | 9/1989 | Yeager et al. | 524/157 |
| 4,863,997 A | 9/1989 | Shibuya et al. | |
| 4,914,153 A * | 4/1990 | Togo et al. | 525/68 |
| 4,994,508 A | 2/1991 | Shiraki et al. | |
| 5,071,912 A | 12/1991 | Furuta et al. | |
| 5,081,187 A | 1/1992 | Maruyama et al. | |
| 5,418,287 A | 5/1995 | Tanaka et al. | |
| 5,756,196 A | 5/1998 | Choa et al. | |
| 6,031,049 A | 2/2000 | Chino et al. | |
| 6,147,161 A | 11/2000 | Chao et al. | |
| 6,303,216 B1 | 10/2001 | Chao et al. | |
| 6,350,514 B1 | 2/2002 | Venderbosch | |
| 6,365,665 B1 | 4/2002 | Chao et al. | |
| 6,495,630 B2 | 12/2002 | Adedeji et al. | |

FOREIGN PATENT DOCUMENTS

| | | |
|---|---|---|
| EP | 326895 A2 * | 8/1989 |
| EP | 0 448 341 A1 | 3/1991 |
| EP | 0 493 674 | 11/1991 |
| EP | 0 605 195 | 12/1993 |
| EP | 0 751 185 | 6/1996 |
| EP | 0 849 329 | 12/1997 |
| EP | 0412787 A2 | 3/2002 |
| WO | WO 03/000797 A2 | 1/2003 |

OTHER PUBLICATIONS http://www.shinwoochem.com/english/product/epomin_intro.asp (2 pages).
http://www.shinwoochem.com/english/product/epomin_specification.asp (2 pages).
http://www.shinwoochem.com/english/product/epomin_products.asp (1 page).
http://www.shinwoochem.com/english/product/epomin_reactivity.asp (2 pages).
http://www.shinwoochem.com/english/product/epomin_industrial.asp (10 pages).
http://www.polymerenterprises.com/prod02.htm (2 pages).
http://www.polymerenterprises.com/prod01.htm (3 pages).
http://www.polymerenterprises.com/serv01.htm (2 pages).
http://www.polymerenterprises.com/ (3 pages).
http://www.polymerenterprises.com/prod03.htm (2 pages).
D Horn "Polyethylenimine-Physicochemical Properties and Applicatins". Supplied by the British Library-"The world's knowledge" www.bl.uk. pp. 333-355.
ASTM D 3359-02. "Standard Test Methods for Measuring Adhesion by Tape Test". pp. 1-7.
International Search Report dated Aug. 18, 2004.

* cited by examiner

*Primary Examiner*—Kuo-Liang Peng
(74) *Attorney, Agent, or Firm*—Cantor Colburn LLP

(57) ABSTRACT

A resin composition for improving adhesion with polyurethane foam is disclosed which comprises:
(a) about 10 to about 80 percent by weight of at least one polyphenylene ether resin;
(b) about 20 to about 70 percent by weight of at least one polyolefin polymer;
(c) about 1 to about 20 percent by weight of at least one amine compound; and
(d) 0 to about 4 percent by weight of at least one adhesion promoter, wherein all percentages are based on the weight of the entire composition.

In preferred embodiments, the resin composition further comprises at least one member of the group consisting of polyphenylene ether-polyolefin copolymers, polystyrene-polyolefin copolymers, and polystyrene resins. Also disclosed herein is a method for improving adhesion between a resin composition and polyurethane foam.

29 Claims, No Drawings

COMPOSITION AND METHOD FOR IMPROVING THE SURFACE ADHESION OF RESIN COMPOSITIONS TO POLYURETHANE FOAM

BACKGROUND OF THE INVENTION

The invention relates to novel resin compositions having improved adhesion to polyurethane foam. The invention also relates to a method for improving adhesion between a resin composition and polyurethane foam.

Thermoplastic resins have become of interest in recent years as a replacement for metal in the interior parts of automobiles, such as the manufacture of instrument panels, top covers and arm rests in the interior of the car. In these applications one requirement of the thermoplastic resin is that it must adhere to the polyurethane foam that is often used as a covering. Resin compositions containing polyphenylene ether and polyolefins, e.g., polypropylene, as their primary constituents are generally known and are especially attractive for these automotive applications because of their excellent chemical resistance, high impact strength, low relative cost, and good dimensional stability.

U.S. Pat. No. 4,713,416 to Del Giudice et al. generally describes compositions comprising (a) a polyphenylene ether, (b) a thermoplastic polymer incompatible with the polyphenylene ether, and (c) a polymeric compatibility-promoting agent comprising one or more blocks of vinylaromatic monomer units compatible with the polyphenylene ether (a) and one or more blocks of monomeric units of the same nature as the thermoplastic polymer (b) or compatible with that polymer.

U.S. Pat. No. 4,764,559 to Yamauchi et al. generally describes a composition comprising (a) a polyphenylene ether having a low degree of polymerization, with or without a styrene resin, (b) a polyolefin, and (c) a styrene compound/conjugated diene block copolymer or a hydrogenation product thereof.

U.S. Pat. No. 4,863,997 to Shibuya et al. generally describes a composition comprising (a) a polyolefin resin, (b) a polyphenylene ether resin, and (c) a hydrogenated block copolymer of an alkenyl aromatic compound and a conjugated diene which contains 45–80 weight percent of a repeating unit derived from the alkenyl aromatic compound.

U.S. Pat. No. 4,994,508 to Shiraki et al. generally describes a composition comprising (a) 1–99 parts by weight of a specific hydrogenated block copolymer having at least one polymer block composed mainly of a vinyl aromatic compound and at least one polymer block composed mainly of a conjugated diene compound, and (b) 99–1 parts by weight of at least one thermoplastic substance selected from the group consisting of tackifier resins, thermoplastic resins, and bituminous materials. Thermoplastic resins include polyethylenes, polypropylenes, and polyphenylene ethers, among many others.

U.S. Pat. No. 5,071,912 to Furuta et al. generally describes a composition comprising (a) a polyphenylene ether, (b) a styrene-modified propylene polymer or a composition containing a styrene-modified propylene polymer and polypropylene, and (c) at least two rubbery substances, one being compatible with (a) and the other incompatible with (a).

U.S. Pat. No. 5,081,187 to Maruyama et al. generally describes a composition comprising specific amounts of (a) a polyolefin, (b) a polyphenylene ether, (c) a partially hydrogenated alkenyl aromatic compound-isoprene block copolymer, and (d) an alkenyl aromatic compound-conjugated diene block copolymer.

U.S. Pat. No. 5,418,287 to Tanaka et al. generally describes a composition comprising (a) a polyphenylene ether, (b) a crystalline polyolefin resin, and (c) a graft copolymer where the backbone is a copolymer of (i) ethylene or at least one C3–C 2 alpha-olefin, and (ii) at least one chain non-conjugated diene.

U.S. Pat. No. 6,031,049 to Chino et al. generally describes a composition comprising specie c amounts of (a) a component composed of syndiotactic polystyrene and a polyolefin, (b) a block or graft styrene-olefin copolymer having a styrene content of 40 to 85% by weight, and (c) a polyphenylene ether.

European Patent Application No. 412,787 A2 to Furuta et al. generally describes compositions comprising (a) a polyphenylene ether, (b) a propylene polymer modified by grafting with a styrene-based monomer alone or in combination with another copolymerizable monomer, with or without an unmodified propylene polymer, and (c) a rubbery substance having chain A miscible with all or part of (a) and chain B miscible with all or part of (b).

U.S. Pat. No. 6,495,630 to Adeyinka et al. generally describes thermoplastic compositions that include specified amounts of poly(arylene ether), a polyolefin, a rubber-modified poly(alkenyl aromatic) resin, a hydrogenated block copolymer, an unhydrogenated block copolymer, and an ethylene/alpha-olefin elastomeric copolymer Chao et al. in U.S. Pat. No. 5,756,196 disclosed a composition and method for improving the adhesion of compositions of polyphenylene ether and polystyrene resins to polyurethane foam using primary-amine or secondary-amine containing material.

However, achieving desirable levels of adhesion to polyurethane foam to compositions containing substantial amounts of polyolefins is difficult due to low reactivity and/or surface energy of the polyolefin in these compositions. Thus, there remains a need for compositions of polyphenylene ether and polyolefins, especially polypropylene, that retains the properties of the compositions and that will also provide improved adhesion with polyurethane foam.

SUMMARY OF THE INVENTION

One embodiment of the present invention includes a resin composition that comprises:
  (a) about 10 to about 80 percent by weight of at least one polyphenylene ether resin;
  (b) about 20 to about 70 percent by weight of at least one polyolefin polymer;
  (c) about 1 to about 20 percent by weight of at least one amine compound; and
  (d) 0 to about 4 percent by weight of at least one adhesion promoter; wherein the amount of each component is based upon the total weight of the composition.

The amine compound is selected from the group consisting of polyethyleneimine, cyclohexylamine, 1-hexadecylamine, diethylamine, dipropylamine, and a triamine having the formula:

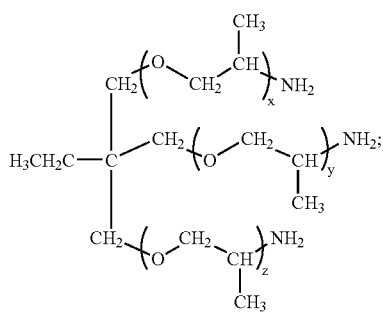

wherein the sum of "x", "y" and "z" is about 5 to about 6, and mixtures containing at least one of the foregoing.

Another embodiment of the invention is a resin composition that comprises greater than or equal to about 20 percent by weight of poly(2,6-dimethyl-1,4-phenylene ether) resin, greater than or equal to about 20 percent by weight of a polypropylene (hereinafter sometimes referred to as "PP") polymer, greater than or equal to 5 percent by weight of at least one polystyrene-polyolefin polymer selected from the group consisting of styrene-ethylene-butylene-styrene block copolymer, styrene-butylene-styrene block copolymer, and styrene-grafted polypropylene polymer, about 20 to about 55 percent by weight of a polystyrene (hereinafter sometimes referred to as "PS") resin, and about 0 to about 4 percent by weight of an organotin adhesion promoter, and about 1 to about 20 percent by weight of an amine compound having a structure as previously described; wherein the amount of each component is based upon the total weight of the composition.

Another aspect of the invention is a method for improving adhesion between a resin composition and polyurethane foam. The method comprises forming the resin composition, where the resin composition comprises: at least one polyphenylene ether resin; at least one polyolefin polymer; at least one of (i) a polyphenylene ether—polyolefin copolymer, (ii) a polystyrene-polyolefin copolymer; and (iii) a polystyrene resin; optionally, at least one of a functionalized polystyrene resin and a functionalized polyolefin resin; about 0 to about 4 percent by weight of an adhesion promoter; and at least one amine compound; wherein the amount of each component is based upon the total weight of the composition; and further wherein said amine is added in an amount that later produces an adhesion strength of greater than or equal to 4, as measured by standard testing method ASTM D 3359A. In this method, the polyolefin-containing resin composition comprises at least about 20 percent by weight of one or more polyolefins, preferably a polypropylene resin.

Another aspect of the invention is a method for improving adhesion between a resin composition and polyurethane foam. The method comprises forming the resin composition, wherein the resin composition comprises: (a) greater than or equal to about 20 percent by weight of poly(2,6-dimethyl-1,4-phenylene ether) resin; (b) greater than or equal to about 20 percent by weight of a polypropylene polymer; (c) greater than or equal to about 5 percent by weight of at least one polystyrene-polyolefin copolymer selected from styrene-butadiene-butylene-styrene triblock copolymer and styrene-butadiene-styrene block copolymer; (d) 0 to about 10 percent by weight of polypropylene-graft-maleic anhydride copolymer; (e) about 20 to about 55 percent by weight of polystyrene resin; (f) 0 to about 4 percent by weight of an organotin adhesion promoter; and (g) about 1 to about 20 percent by weight of an amine compound; wherein the amount of each component is based upon the total weight of the composition; and further wherein said amine is added in an amount that later produces an adhesion strength of greater than or equal to 4, as measured by standard testing method ASTM D 3359A.

A more detailed account of the invention describing the resin compositions and the method for improved adhesion to polyurethane foam is set forth below.

DETAILED DESCRIPTION OF THE INVENTION

The present invention includes resin compositions exhibiting enhanced adhesion to polyurethane foam. The principal components of the resin composition are: (a) at least one polyphenylene ether (hereinafter sometimes referred to as "PPE") resin, (b) at least one polyolefin polymer (hereinafter sometimes referred to as "PO"), (c) at least one amine compound, and (d) optionally, at least one adhesion promoter. The resin composition may further comprise at least one member of the group consisting of polyphenylene ether-polyolefin copolymers, polystyrene-polyolefin copolymers, and polystyrene resins.

Representative examples of PPE resins are known polymers comprising a plurality of structural units of the formula (I):

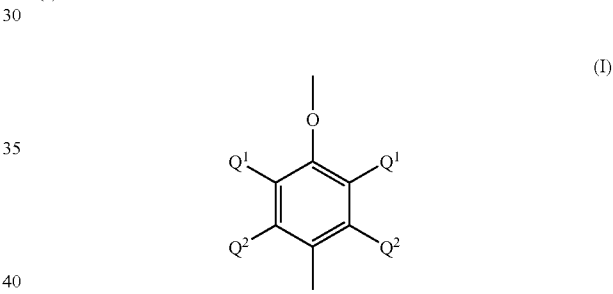

wherein in each of said units independently, each $Q^1$. is independently halogen, primary or secondary lower alkyl (i.e., alkyl containing up to seven carbon atoms), phenyl, haloalkyl, aminoalkyl, hydrocarbonoxy, or halohydrocarbonoxy, wherein at least two carbon atoms separate the halogen and the oxygen atoms; and each $Q^2$ is independently hydrogen, halogen, primary or secondary lower alkyl, phenyl, haloalkyl, hydrocarbonoxy or halohydrocarbonoxy as defined for $Q^1$. In a preferred embodiment, each $Q^1$ is methyl, and each $Q^2$ is hydrogen or methyl.

Both homopolymer and copolymer PPE resins are generally suitable. The preferred homopolymers include those containing 2,6-dimethyl-1,4-phenylene ether units. Suitable copolymers include random copolymers containing such units in combination with, for example, 2,3,6-trimethyl-1,4-phenylene ether units. In one embodiment, the PPE resin is selected from the group consisting of poly(2,6-dimethyl-1,4-phenylene ether), poly(2,3,6-trimethyl-1,4-phenylenelene ether), and poly[(2,6-dimethyl-1,4-phenylene ether)-(2,3,6-trimethyl-1,4-phenylenelene ether)] copolymer. Also included are PPE resins containing moieties prepared by grafting onto the PPE in known manner such materials as vinyl monomers or polymers such as polystyrenes and elastomers, as well as coupled polyphenylene ethers in which coupling agents such as low molecular weight polycarbonates, quinones, heterocycles and formals, undergo reaction in a known manner with the PPE chains to produce various molecular weight polymers.

The PPE resins may be typically prepared by the oxidative coupling of at least one mono-hydroxyaromatic compound such as 2,6-xylenol or 2,3,6-trimethylphenol. Catalyst systems are generally employed for such coupling and they typically contain at least one heavy metal compound such as copper, manganese, or cobalt compound, usually in combination with an amine compound, such as n-dibutylamine, diethylamine, picoline, quinoline, a pyridine base, triisopropylamine, dimethylisopropanolamine, triethanolamine, triisopropanolamine, or diisopropanolamine. Residual amine compounds may be present in the resulting PPE to the extent of several hundred parts per million parts by weight of the PPE. However, at such levels, the amine compounds are ineffective in promoting the desired level of adhesion between a PPE-containing resin composition and a polyurethane foam.

Particularly useful PPE resins for many purposes are those that comprise molecules having at least one aminoalkyl-containing end group. The aminoalkyl radical is typically located in an ortho position to the hydroxy group and is believed to be an artifact of the amine used with the polymerization catalyst. For a PPE derived from polymerization of 2,6-xylenol, the aminoalkyl group would be an aminomethyl group. Also frequently present are 4-hydroxybiphenyl-type end groups, typically obtained from reaction mixtures in which a by-product diquinone from the monomer is present. A substantial proportion of the polymer molecules, typically constituting as much as about 90% by weight of the polymer, may contain at least one of said aminoalkyl-containing and 4-hydroxybiphenyl-type end groups.

In preferred embodiments, the PPE generally has a number average molecular weight from about 3,000 to about 40,000. The polyphenylene ether may have a weight average molecular weight from about 20,000 to about 80,000 as determined by gel permeation chromatography. The intrinsic viscosity (I.V.) of the PPE is in the range from about 0.12 to about 0.6 deciliters per gram, as measured in chloroform at 25° C. Mixtures of various I.V. PPEs are also useful.

In certain embodiments, the amount of PPE in the resin composition is present in about 10 to about 80 percent by weight (based upon the total weight of the resin composition). Within this range, an amount of less than about 70 percent by weight can be employed, with an amount of less that 60 percent by weight especially preferred. Also within this range is an amount of about 15 percent by weight or greater, with an amount of about 20 percent by weight or greater especially preferred.

Another principal component of the resin composition is the PO resin that comprises one or more of (i) homopolymers of propylene (PP), (ii) random copolymers of propylene and an olefin selected from ethylene and $C_4$–$C_{10}$ alpha-olefins, and (iii) random terpolymers of propylene with two olefins selected from the group consisting of ethylene and $C_4$–$C_{10}$ alpha-olefins. In a particular embodiment, the PO is selected from the group consisting of PP, ethylene/propylene copolymer, impact-modified ethylene/propylene copolymer, and mixtures thereof. In the case of the random copolymers of category (ii), when the olefin is ethylene, the maximum polymerized ethylene content is about 10% by weight in one embodiment, and about 4% by weight in another embodiment. When the alpha-olefin is a $C_4$–$C_{10}$ alpha-olefin, the maximum polymerized alpha-olefin content in the resulting copolymer is about 20% by weight in one embodiment, and about 16% by weight in another embodiment. In the case of the random terpolymers of category (iii), the maximum content of polymerized $C_4$–$C_{10}$ alpha-olefin is about 20% by weight in one embodiment, and about 16% by weight in another embodiment. When ethylene is one of the alpha-olefins, the maximum content of polymerized ethylene in the random terpolymer is about 5% by weight in one embodiment, and about 4% by weight in another embodiment. In some embodiments, the polyolefin also comprises polyethylene copolymers made using metallocene catalysts. Examples of such polyolefins include the EXACT® series of poly(ethylene-alpha olefin) copolymers, such as EXACT® 3024, 3022, 3128, 3035, 4011, 4033, 4006, 4041, 4049, 3132, 3131, 3139, 3040, 4151, 4150, 4056, 0201, 0201HS, 0210, 0230, 8201, 8203, and 8210, available from ExxonMobil Corp. The poly (ethylene-alpha olefin) copolymers are generally prepared in a solution phase using metallocene catalysts. By selecting appropriate molar ratios of ethylene and the alpha olefin comonomer, a variety of polyethylene-alpha olefin copolymers having a range of general properties, such as density, melt flow rate, VICAT softening, and brittleness; film properties, such as gloss, haze, puncture resistance energy, and impact resistance energy; molded plaque properties, such as tensile strength at break, elongation strength at break, flexural modulus, and notched Izod values, and elastomeric properties, such as Mooney viscosity can be obtained Preferred PO used in the present invention includes PP homopolymers. PP homopolymers having a crystalline content of at least about 20%, preferably at least about 30% can also be used. Suitable PP homopolymers include those having a melt flow rate (measured in grams per 10 minutes) within the range of about 0.5 to about 10.0, with those within the range of about 0.5 to about 4.0 especially preferred. Preferred PP homopolymers include those available from Basell (formerly Montell Polyolefins of North America), such as for example, the Pro-fax® series of polymers, such as Pro-fax® 7823, 7624, 7601S, 7531, 7523, 6823, 6524, KF6190H, PDC1276, PDC1282, PD403, and 6523; and the Moplen® series, such as Moplen® HP400H, HP522J, and HP550J. Preferred POs also include high molecular weight PP homopolymers having a melt flow rate (expressed in grams per 10 minutes) of from about 25 to about 45, with around 30–35 being more preferred. Non-limiting examples of such PP homopolymers include Profax® PD702N, PD702, PDC1284, PDC1292, PDC1302, PF304, PH020, and PH385, available from Basell.

In another embodiment, the PO is a PP copolymer comprising from about 5 to about 30 percent by weight of ethylene-propylene random copolymer units, which acts as an impact-modifier. In another embodiment, the PO is a PP comprising from about 2 to about 8 percent by weight of ethylene-propylene-non-conjugated diene copolymer units, which acts as an impact modifier. The ethylene content in the two types of random copolymers is from about 20 to about 70 percent by weight of the overall copolymer. Suitable PO polymers are also exemplified by polypropylene, polyethylene, ethylene-propylene copolymers, ethylene-propylene-nonconjugated diene copolymer, poly(1-butene), poly(1-pentene), poly(4-methylpentene-1,3-methyl-1-butene), poly (1-hexene), poly(3,4-dimethyl-1-butene), poly(1-heptene), poly(3-methyl-1-hexene), poly(1-octene), and mixtures containing any of the foregoing polyolefin polymers.

In certain embodiments, the amount of PO in the resin composition is present in about 10 to about 80 percent by weight (based upon the total weight of the resin composition). Within this range, an amount of less than about 70 percent by weight can be employed, with an amount of less that 60 percent by weight especially preferred. Also within this range is an amount of about 15 percent or greater, with an amount of about 20 percent or greater especially preferred.

Some preferred embodiments of the present invention include resin compositions which further comprise about 2 percent to about 30 percent by weight (based upon the total weight of the resin composition) of at least one impact modifier member selected from the group consisting of PPE-PO copolymers, polystyrene-polyolefin (hereinafter sometimes referred to as "PS-PO") copolymers, and PS resins. The PPE-PO copolymers are selected from the group consisting of PPE-PP copolymers, PPE-PE copolymers, PPE-ethylene/propylene copolymers, and any mixture of the foregoing PPE-PO copolymers.

The PS-PO copolymers are selected from the group consisting of PS-PP copolymers, partially hydrogenated PS-conjugated diene block copolymer, partially hydrogenated PS-conjugated diene-olefin block copolymers, and any mixture of the foregoing PS-PO copolymers. Graft copolymers resulting from free radical-initiated grafting of a styrenic monomer on to the backbone of a PO polymer are an example of PS-PO copolymers. The free-radical sites may be produced by irradiation or by a free-radical generating chemical material, e.g., by reaction with a suitable organic peroxide. The PO polymer is selected from the group consisting of PP homopolymers, ethylene/propylene copolymer, impact-modified ethylene/propylene copolymer, and mixtures thereof. The styrenic grafting monomer is styrene, an alkyl ring-substituted styrene, where the alkyl is methyl or ethyl, or combinations thereof. In some embodiments the styrenic grafting monomers are styrene, alpha-methylstyrene, and mixtures thereof.

In one embodiment the styrenic grafted PO polymer impact modifier material consists of a graft copolymer of styrene on PP backbone, such as Interloy P10451 (available from Montell Polyolefin Company), in a second embodiment a graft copolymer of styrene on ethylene/propylene random copolymer backbone, in a third embodiment a graft copolymer of styrene on ethylene/propylene rubber impact-modified PP backbone, in a fourth embodiment a graft copolymer of styrene/alpha-methylstyrene on PP backbone, in a fifth embodiment, a graft copolymer of styrene/alpha-methylstyrene on ethylene/propylene random copolymer backbone and in a sixth embodiment a graft copolymer of styrene/alpha-methylstyrene on ethylene-propylene rubber impact-modified PP backbone.

The PS-PO copolymer can also be a partially hydrogenated block copolymer of a styrene compound, a conjugated diene, and an olefin, wherein the hydrogenated block copolymer has up to about 20 percent residual pendant aliphatic unsaturation and at least about 30 percent residual in-chain aliphatic unsaturation. In some embodiments, the hydrogenated block copolymer is a selectively hydrogenated block copolymer comprising (A) at least one block derived from a styrene compound, and (B) at least one block derived from a conjugated diene, in which the aliphatic unsaturated group content in the block (B) has been selectively reduced by hydrogenation. In particular, in-chain aliphatic unsaturation (i.e., aliphatic unsaturation resulting from 1,4-incorporation of the conjugated diene to the copolymer) remains at least about 30 percent unhydrogenated, preferably at least about 40 percent unhydrogenated, more preferably at least about 50 percent unhydrogenated; and pendant aliphatic unsaturation (i.e., aliphatic unsaturation resulting from 1,2-incorporation of the conjugated diene to the copolymer) remains up to about 20 percent unhydrogenated, preferably up about 10 percent unhydrogenated, more preferably up to about 5 percent unhydrogenated. In one embodiment, the ratio of the percentage of unhydrogenated in-chain aliphatic unsaturation to the percentage of unhydrogenated pendant aliphatic unsaturation is at least about 2, preferably at least about 5, more preferably at least about 10. The degree of hydrogenation of in-chain and pendant aliphatic unsaturation may be evaluated by a variety of methods, including infrared spectroscopy, and $^1$H and $^{13}$C nuclear magnetic resonance (NMR) spectroscopic techniques.

The arrangement of blocks (A) and (B) in the hydrogenated block copolymer, referred to above includes a linear structure, a grafted structure, and a radial teleblock structure with or without a branched chain. Preferred among these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B-A triblock structure being particularly preferred.

The styrene compound used in providing block (A) is represented by the formula (II):

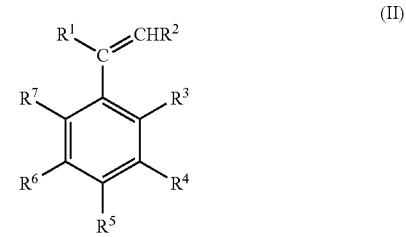

wherein $R^1$ and $R^2$ each independently represent a hydrogen atom, a $C_1$–$C_8$ alkyl group, a $C_2$–$C_8$ alkenyl group, or the like; $R^3$ and $R^7$ each independently represent a hydrogen atom, a $C_1$–$C_8$ alkyl group, a chlorine atom, a bromine atom, or the like; and $R^4$–$R^6$ each independently represent a hydrogen atom, a $C_1$–$C_8$ alkyl group, a $C_2$–$C_8$ alkenyl group, or the like, or $R^3$ and $R^4$ are taken together with the central aromatic ring to form a naphthyl group, or $R^4$ and $R^5$ are taken together with the central aromatic ring to form a napthyl group.

Specific examples, of the styrene compounds include styrene, p-methylstyrene, alpha-methylstyrene, vinylxylenes, vinyltoluenes, vinylnaptthalenes, divinylbenzenes, bromostyrenes, chlorostyrenes, and the like, and combinations comprising at least one of the foregoing styrene compounds. Of these, styrene, alpha-methylstyrene, p-methylstyrene, vinyltoluenes, and vinylxylenes are preferred, with styrene being more preferred.

Specific examples of the conjugated diene include 1,3-butadiene, 2-methyl-1,3-butadiene, 2,3-dimethyl-1,3-butadiene, 1,3-pentadiene, and the like. Preferred among them are 1,3-butadiene and 2-methyl-1,3-butadiene, with 1,3-butadiene being more preferred. In addition to the conjugated diene, the selectively hydrogenated block copolymer may contain a small proportion of one or more of a lower olefinic hydrocarbon such as, for example, ethylene, propylene, 1-butene, dicyclopentadiene, a non-conjugated diene, and the like.

The content of the repeating unit derived from the styrene compound in the selectively hydrogenated block copolymer may be about 20 to about 90 weight percent, based on the total weight of the selectively hydrogenated block copolymer. Within this range, the styrene content may preferably be at least about 30 weight percent, more preferably at least about 55 weight percent. Also within this range, the styrene content may preferably be less than about 80 weight percent, more preferably less than about 75 weight percent. There is no particular limitation on the mode of incorporation of the conjugated diene in the selectively hydrogenated block copolymer backbone. For example, when the conjugated diene is 1,3-butadiene, it may be incorporated with about 1% to about 99% 1,2-incorporation, with the remainder being 1,4-incorporation.

The hydrogenated block copolymer preferably may have a number average molecular weight of about 5,000 to about 500,000 grams per mole, as determined by gel permeation chromatography (GPC) using polystyrene standards. The molecular weight distribution of the selectively hydrogenated block copolymer as measured by GPC is not particularly limited. The copolymer may have any ratio of weight average molecular weight to number average molecular weight. Particularly preferred selectively hydrogenated block copolymers are the styrene-(butadiene-butylene) diblock and styrene-(butadiene-butylene)-styrene triblock copolymers obtained by highly selective hydrogenation of styrene-butadiene and styrene-butadiene-styrene triblock copolymers, respectively. For example, styrene-(butadiene-butylene)-styrene triblock copolymers result when the pendant unsaturation in the styrene-butadiene-styrene triblock copolymer precursor is essentially completely hydrogenated (i.e., at least about 95% hydrogenated; preferably at least about 98% hydrogenated), whereas the in-chain unsaturation remains at least about 30% unhydrogenated.

In certain embodiments, the resin compositions further comprise from about 2 percent to about 30 percent by weight (based upon the total weight of the resin composition) of one or more polystyrene-polyolefin copolymers selected from the group consisting of PS-PP copolymers, styrene-grafted polypropylene graft copolymers, hydrogenated PS-conjugated diene block copolymer, hydrogenated PS-conjugated diene-olefin block copolymers, and any mixture of the foregoing PS-PO copolymers. In one embodiment, the PS-PO copolymer is selected from one or more hydrogenated and non-hydrogenated styrene-butadiene-styrene block copolymers, styrene-isoprene-styrene block copolymers, styrene-ethylene/butylene-styrene block copolymers, styrene-ethylene/propylene-styrene block copolymers, and any mixture of the foregoing PS-PO copolymers. In another embodiment, the selectively hydrogenated block copolymer may be synthesized by block polymerization followed by hydrogenation as described, for example, in U.S. Pat. No. 4,994,508 to Shiraki et al. Suitable selectively hydrogenated block copolymers include the styrene-(butadiene-butylene)-styrene triblock copolymers commercially available from Asahi Chemical as, for example, TUFTEC® P-series copolymers. The KRATON® series of polymers, such as, for example, KRATON® G1650 and G1652, available from Kraton Polymers can also be used. Suitable non-hydrogenated block copolymers further include the styrene-butadiene radial teleblock copolymers available as, for example, K-RESIN® KR01, KR03, KR05, and KR10 sold by Chevron Phillips Chemical Company and the styrene-butadiene tapered block copolymers available as FINACLEAR® 520 from Atofina Petrochemicals Inc.

In other embodiments, propylene homopolymers and random copolymers impact modified with an ethylene-propylene-diene monomer rubber having a diene content of about 2 to about 8 weight percent also can be used as the propylene polymer material for the hydrogenated styrene-conjugated diene-olefin block copolymer, within some aspects of the present invention. Suitable dienes include dicyclopentadiene, 1,6-hexadiene, ethylidene norbornene, and the like. In a particular embodiment, the hydrogenated styrene-conjugated diene-olefin block copolymer is at least one copolymer selected from styrene-butadiene-styrene block copolymer, styrene-isoprene-styrene block copolymer, styrene-ethylene/butylene-styrene block copolymer, styrene-ethylene/propylene-styrene block copolymer, and mixtures thereof.

The resin compositions may further optionally comprise about 2 percent by weight to about 30 percent by weight (based upon the total weight of the resin composition) of functionalized PPE resin. By functionalized PPE resin is meant a PPE containing at least one moiety selected from the group consisting of amino, epoxy, carboxylic acid, carboxylic ester, ortho ester, anhydride, aliphatic carbon-carbon double bond. The resin compositions may also comprise reaction products obtained by reaction of terminally functionalized polyphenylene ethers and functionalized polyolefins. One example of such a reaction product is the product resulting from reaction of a glycidyloxy-functionalized polyphenylene ether and polypropylene-acrylic acid copolymer. A second example of a reaction product is one resulting from reaction of an amino-functionalized PPE with a polyolefin containing residual epoxy moieties. Mixtures of various functionalized PPE, e.g., mixtures of glycidyloxy-functionalized PPE and amino-functionalized PPE, can also comprise the resin compositions disclosed herein. A functionalized PS resin, such as for example, those prepared from reactions of a functionalized PS, such as PS-glycidyl methacrylate copolymer with a functionalized PO, such as polypropylene-acrylic acid copolymer or polyethylene-acrylic acid copolymer may also be optionally used in the resin composition. The functionalized PO is selected from ethylene-acrylic acid copolymers, such as for example, Primacor® made by Dow Chemical, and Escorene® made by ExxonMobil Chemical); polypropylene-acrylic acid copolymers, such as for example, (Polybond® made by Uniroyal Chemical); polyethylene-methacrylic acid copolymers, such as for example (Nucrel® made by Dupont), and polypropylene-methacrylic acid copolymer. Graft copolymers comprising a polyolefin backbone and polar grafts formed from one or more cyclic anhydrides can also be optionally used. Such materials include graft copolymers of polyolefins and $C_4$–$C_2$ cyclic anhydrides, such as, for example, those available from ExxonMobil under the tradename EXXELOR® PO1020, and from DuPont under the tradename FUSABOND®, such as. Examples of suitable polyolefin-graft-poly(cyclic anhydride) copolymers are the polypropylene-graft-poly(maleic anhydride) materials supplied by ExxonMobil, such as EXXELOR® PO1020 and EXXELOR® 1015, the FUSABOND® series of materials supplied by DuPont, such as FUSABOND M613-05, MD353D, and MZ203D; the POLYBOND® series made by Uniroyal Chemicals, the LOTADER® series made by Atofina Petrochemicals Inc., and mixtures thereof. Suitable amounts of such materials may be readily determined and are generally about 0.1 to about 10 weight percent, based on the total weight of the composition. Within this range, an amount greater than or equal to about 0.5 weight percent may be preferred. Also within this range, polyolefin-graft-poly(cyclic anhydride) copolymer amounts of up to about 5 weight percent may be preferred, and amounts up to about 2 weight percent may be more preferred. The functionalized PS is selected from polystyrene-glycidyl methacrylate copolymer, polystyrene-glycidyl methylmethacrylate copolymer, poly-alpha-methylstyrene-glycidyl methacrylate copolymer, poly-alpha-methylstyrene-glycidyl methylmethacrylate copolymer, or mixtures thereof. In general, the styrenic monomer used for the functionalized poly(alkenylaromatic) is one or more styrenes selected from the group represented by the general formula (II) as described previously.

The PS resins that may be used include homopolymers and copolymers of styrenic monomers, such as those represented by formula (II). Specific examples of styrenic monomers that can used include styrene, alpha-methylstyrene, 4-methylstyrene, and dibromostyrene. In one embodiment, the PS is a polymer of styrene, a substituted styrene, or mixtures thereof. The resin composition disclosed herein further comprises one or more PS resins selected from the group consisting of crystalline polystyrene resins, high flow polystyrene resins which have a melt flow rate in the range from about 5 to about 10, such as 147F and 148G available from BASF Corporation; EA3050 resin available from Chevron Philips Corporation, STYRON® 668, 666D, and 675 grade resins available from Dow Chemical Company; and 1500, 1504, 1510, 1511, 1600, 2500, 2504, 2510, 2511, 2580, 2581, and 2590 grade crystal resins available from NOVA Chemicals; and conventional rubber-modified polystyrenes, sometimes designated "high impact polystyrene" or "HIPS".

When present, the PS resin component is present in about 10 to about 80 percent by weight (based upon the total weight of the resin composition). Within this range, an amount of less than about 70 percent by weight can be employed, with an amount of less that 60 percent by weight especially preferred. Also with this range is an amount of about 15 percent or greater, with an amount of about 20 percent or greater especially preferred.

The amine compound used in the resin composition of the present invention contains at least one primary amine group, a secondary amine group, or both. Useful amine compounds include:

A) polyamines having a backbone of the formula (III):

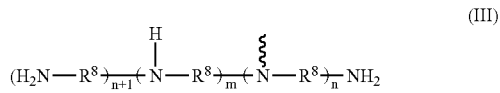

(III)

wherein $R^8$ is $C_2$–$C_8$ alkylene, $C_3$–$C_8$ alkyl-substituted alkylene, and mixtures thereof; "m" has a value from from 2 to about 700; and "n" has a value from about 0 to about 350;

B) polyamines having a backbone of the formula (IV):

(IV)

wherein "q" has a value from about 5 to about 10,000, and (C) polyamine compounds wherein about 0% to about 100% of the polyamine backbone NH units are substituted by one or more groups of the formula $(R^9O)_pR^{10}$—, wherein $R^9$ is $C_2$–$C_8$ alkylene, $C_3$–$C_8$ alkyl substituted alkylene, and mixtures thereof;

$R^{10}$ is hydrogen, $C_1$–$C_4$ alkyl, and mixtures thereof; and "p" has values from about 1 to about 12; and (D) at least one primary amine selected from the group consisting of cyclohexylamine, 1-hexadecylamine, and a triamine having the formula (V):

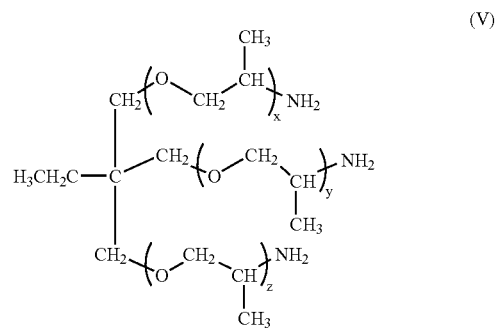

(V)

wherein the sum of "x", "y" and "z" is about 3 to about 20; and at least one secondary amine selected from the group consisting of diethylamine and dipropylamine.

Polyethyleneimines are suitable amine compounds. One example of a commercially available polyethyleneimine is EA-275 available from The Dow Chemical. Furthermore, the triamines of formula (V) wherein the sum of "x", "y" and "z" is about 5 to 6 are preferred. Some members of the triamines of formula (V) are commercially available, such as for example, Jeffamine T-403, which is commercially available from Huntsman Chemical.

In one embodiment, less than 50% of the $R^8$ groups comprising the polyamine backbone of formula (III) have more than 3 carbon atoms. In other embodiments, less than 25% of the $R^8$ groups, and less than 10% of the $R^8$ groups comprising the polyamine backbone have more than three carbon atoms. In a particularly preferred embodiment, substantially all of the $R^8$ groups are ethylene residues.

The polyamines may be homogeneous or non-homogeneous polyamines backbones, preferably homogeneous backbones. For the purpose of the present invention, the term "homogeneous polyamine backbone" is defined as a polyamine backbone having $R^8$ units that are the same, (e.g., all ethylene). However, this definition does not exclude polyamines that comprise other extraneous units comprising the polymer backbone that are present due to an artifact of the chosen method of chemical synthesis. For example, it is known to those skilled in the art that ethanolamine may be used as an "initiator" in the synthesis of polyethyleneimines, therefore a sample of polyethyleneimine that contains one hydroxyethyl moiety resulting from the polymerization "initiator" would be considered to comprise a homogeneous polyalkyleneimine backbone for the purposes of the present invention.

As used herein, the term "non-homogeneous polymer backbone" refers to polyamine backbones that are a composite of one or more alkylene or substituted alkylene moieties, for example, ethylene and 1,2-propylene units taken together as $R^8$ units.

Other classes of polyamines that can be used as an amine compound include, but are not limited to, polyalkyleneamines (hereinafter sometimes referred to as "PAA's"), polyalkyleneimines (abbreviated as "PAI's"), preferably polyethyleneimines (hereinafter sometimes referred to as PEI's). Polyethyleneimines are also sometimes referred to as polyethyleneamine (abbreviated as "PEA's"). A common PAA is tetrabutylenepentamine. PEA's are obtained by reactions involving ammonia and ethylene dichloride, followed by fractional distillation. The common PEA's obtained are triethylenetetramine and tetraethylenepentamine. The higher PEA's, i.e., the hexamines, heptamines, octamines and possibly nonamines, are generally obtained as a cogenerically-derived mixture, which generally cannot be separated by distillation; and can include other materials, such as cyclic amines, particularly piperazines; and cyclic amines with side chains containing nitrogen atoms. The preparation of PEA's can be found, for example, in U.S. Pat. No. 2,792,372, Dickinson et al., issued May 14, 1957. For the purposes of the present disclosure, a polyethyleneimine can comprise primary ($NH_2$) and secondary (NH) amine groups. In addition to the PEI's described above, polymeric amines having pendant $NH_2$ groups in the repeat unit can also function as the amine compound.

The PEI's can be prepared, for example, by polymerizing an ethyleneimine in the presence of a catalyst such as carbon dioxide, sodium bisulfite, sulfuric acid, hydrogen peroxide, hydrochloric acid, acetic acid, etc. Specific methods for preparing PEI's are disclosed in U.S. Pat. No. 2,182,306, Ulrich et al., issued Dec. 5, 1939; U.S. Pat. No. 3,033,746, Mayle et al., issued May 8, 1962; U.S. Pat. No. 2,208,095, Esselmann et al., issued Jul. 16, 1940; U.S. Pat. No. 2,806,839, Crowther, issued Sep. 17, 1957; and U.S. Pat. No. 2,553,696, Wilson, issued May 21, 1951. In addition to the linear and branched PEI's, the present invention also includes the cyclic amines that are typically formed as artifacts of synthesis. The presence of these materials may be increased or decreased depending on the conditions chosen by the formulator.

In one embodiment, the amine compound is present in about 1 to about 20 percent by weight (based upon the total weight of the resin composition). Within this range, an amount of less than about 15 percent by weight can be employed, with an amount of less that 10 percent by weight especially preferred. Also with this range is an amount of about 2 percent or greater, with an amount of about 5 percent or greater especially preferred.

The composition for improving adhesion between the resin composition and the polyurethane foam may optionally include an adhesion promoter. Such adhesion promoters can be, for example, a polyurethane adhesion promoter adhesion promoter. Examples of polyurethane adhesion promoters include organometallic compounds such as, e.g., tin carboxylates and potassium carboxylates. Organotin compounds and bismuth and zinc compounds can be used as adhesion promoters. In one embodiment, the adhesion promoter is an organotin compound is at least one selected from the group consisting of dibutyltin dilaurate, dibutyltin oxide, and dioctyltin oxide. When used, the adhesion promoter is present in about 0.1 to about 5 percent by weight (based upon the total weight of the resin composition). Within this range, an amount of less than about 4 percent by weight can be employed, with an amount of less that 1 percent by weight especially preferred. Also with this range is an amount of about 0.2 percent or greater, with an amount of about 0.5 percent or greater especially preferred.

The compositions as described herein may also comprise one or more additives known in the art. Such additives may include, for example, antioxidants, such as primary and secondary antioxidants, stabilizers, such as heat stabilizers; UV absorbers, mold release agents, processing aids, flame retardants, drip retardants, nucleating agents, dyes, pigments, particulate conductive fillers (e.g., conductive carbon black, and carbon nanotubes having an average diameter of about 1 to about 500 nanometers), reinforcing fillers, antioxidants, anti-static agents, blowing agents, and the like. Reinforcing fillers may include, for example, inorganic and organic materials, such as fibers, woven fabrics and non-woven fabrics of the E-, NE-, S-, T- and D-type glasses and quartz; carbon fibers, including poly(acrylonitrile) (PAN) fibers, carbon nanotubes, and especially graphitic carbon nanotubes; potassium titanate single-crystal fibers, silicon carbide fibers, boron carbide fibers, gypsum fibers, aluminum oxide fibers, asbestos, iron fibers, nicked fibers, copper fibers, wollastonite fibers; and the like. The reinforcing fillers may be in the form of glass roving cloth, glass cloth, chopped glass, hollow glass fibers, glass mat, glass surfacing mat, and non-woven glass fabric, ceramic fiber fabrics, and metallic fiber fabrics. In addition, synthetic organic reinforcing fillers may also be used including organic polymers capable of forming fibers. Illustrative examples of such reinforcing organic fibers are poly(ether ketone), poly(phenylene sulfide), polyesters, aromatic polyamides, aromatic polyimides or polyetherimides, acrylic resins, and poly (vinyl alcohol). Fluoropolymers such as polytetrafluoroethylene may be used. Also included are natural organic fibers known to one skilled in the art, including cotton cloth, hemp cloth, and felt, carbon fiber fabrics, and natural cellulosic fabrics, such as Craft paper, cotton paper, and glass fiber containing paper. Such reinforcing fillers could be in the form of monofilament or multifilament fibers and could be used either alone or in combination with another type of fiber, through, for example, co-weaving or core-sheath, side-by-side, orange-type, or matrix and fibril constructions, or by other methods known to one skilled in the art of fiber manufacture. They may be in the form of, for example, woven fibrous reinforcements, non-woven fibrous reinforcements, or papers. Talc and mica can also be used as a reinforcing filler.

Suitable primary and secondary antioxidants useful in the instant compositions embrace a large family of organophosphorus compounds. Non-limiting examples of such compounds include tris(2,4-di-tert-butylphenyl)phosphite, 3,9-di(2,4-di-tert-butylphenoxy)-2,4,8,10-tetraoxa-3,9-diphosphaspiro[5.5]undecane, 3,9-di(2,4-dicumylphenoxy)-2,4,8,10-tetraoxa-3,9-diphosphaspiro[5.5]undecane, tris(p-nonylphenyl)phosphite, 2,2',2"-nitrilo[triethyl-tris[3,3',5,5'-tetra-tertbutyl-1,1'-biphenyl-2'-diyl]phosphite], 3,9-distearyloxy-2,4,810-tetraoxa-3,9-diphospaspiro[5,5] undecane, dilauryl phosphite, 3,9-di[2,6-di-tert-butyl-4-methylphenoxy]-2,4,8,10-tetraoxa-3,9-diphosphaspiro[5.5] undecane and tetrakis(2,4-di-tert-butylphenyl) 4,4'-bis (diphenylene)phosphontic, distearyl pentaerythritol diphosphite, diisodecyl pentaerythritol diphosphite, 2,4,6-tri-tert-butylphenyl-2-butyl-2-ethyl-1,3-propanediol phosphite, tristearyl sorbitol triphosphite, tetrakis(2,4-di-tert-butylphenyl)4,4'-biphenylene diphosphonite, (2,4,6-tri-tert-butylphenyl)-2-butyl-2ethyl-1,3-propanediolphosphite, tri-isodecylphosphite, and mixtures of phosphites containing at least one of the foregoing. Tris(2,4-di-tert-butylphenyl) phosphite, 2,4,6-tri-tert-butylphenyl-2-butyl-2-ethyl-1,3-propanediol phosphite, bis(2,4-di-tert-butylphenyl)pentaerythritol diphosphite are especially preferred, as well as mixtures of phosphites containing at least one of the foregoing phosphites, and the like.

Suitable heat stabilizers that can be used in the compositions of the invention include, but are not intended to be limited to zinc, calcium/zinc, barium/zinc, and calcium/barium/zinc based materials. Examples of such heat stabilizers include the PlastiStab™ 3000 series of stabilizers, such as PS3001™, PS3002™, PS3003™, PS3004™, and $PS_{3005}$™; the PlastiStab™ 4000 series of stabilizers, such as $PS_{4000}$™, PS4001™, PS4002™, and PS4003™; zinc sulfide, cadmium sulfide, and mixtures thereof; Interstab™ BZ-5240, Interstab™ BZ-5242, and Interstab™ BZ-5246 available from Ackros Chemicals Limited, and the like.

Suitable ultraviolet (UV) absorbers that are useful in the compositions of the instant invention include inorganic as well as combinations of inorganic and organic compounds that act as UV absorbers by absorbing UV radiation, predominantly in the 280–315 nanometers range. Non-limiting examples of inorganic metal oxide compounds as UV absorbers include various types of titanium dioxides, such as the micronized transparent grades exemplified by Hombitec$^R$ RM 300 and Hombitec$^R$ RM 400, manufactured by Sachtleben Chemie GmbH; zinc oxide, such as micronized zinc oxide; micronized silica, and micronized iron oxide. It is preferred that the micronized inorganic metal oxides have an average particle of less than about 200 microns.

Suitable flame retardant additives that can be used include brominated polystyrenes, and phosphorus-containing chemicals, such as triphenylphosphate, tri-t-butylphenylphosphate, tetraphenylresorcinol bisphosphate, tetraxylylresorcinol bisphosphate, tetraphenylhydroquinone bisphosphate, and tetraxylylhydroquinone bisphosphate. The composition may also include mold release compounds, such as polyethylene.

The addition of a phenolic additive may further enhance the adhesion of polyurethane foam to the resin composition. An example of a suitable phenolic additive is Nirez® 2150 (available from Arizona Chemical), a terpenephenol made by reacting limonene with phenol.

The resin compositions of the disclosure are suitable for the formation of articles or components of articles using a variety of molding techniques such as, for example, injection molding, blow molding, extrusion, sheet extrusion, film extrusion, profile extrusion, protrusion, compression molding, thermoforming, pressure forming, hydroforming, vacuum conning, foam molding, and the like. Useful articles comprising the composition and its reaction products include, for example, automotive fascia, automotive modules, automotive grill opening reinforcements, food trays, and power tool casings.

The method for improving adhesion between the resin composition and the polyurethane foam can be advantageously carried out by first forming the resin composition, where the resin composition comprises: at least one polyphenylene ether resin; at least one PO polymer; at least one of (i) PPE-PO copolymers, (ii) PS-PO copolymers, and (iii) PS resins; about 0 to about 4 parts of an adhesion promoter; and at least one amine compound wherein the amine is added in an amount that later produces an adhesion strength to a polyurethane foam of greater than or equal to 4, as measured by standard testing method ASTM D 3359A. In many embodiments of the method, the PPE-PO copolymer is selected from the group consisting of PPE-PP copolymers, PPE-polyethylene copolymers, and PPE-ethylene propylene copolymers, and any mixture of the foregoing PPE-PO copolymers; the PS-PO copolymer is selected from the group consisting of PS-PP copolymers, hydrogenated PS-conjugated diene block copolymers, hydrogenated PS-conjugated diene-olefin block copolymers, and any mixture of the foregoing PS-PO copolymers; and the PS resin is selected from the group consisting of PS resin, HIPS resin, and mixtures thereof.

In one embodiment, the method for improving adhesion between a resin composition and polyurethane foam comprises forming a resin composition, wherein the resin composition comprises: (a) greater than or equal to about 20 parts by weight of poly(2,6-dimethyl-1,4-phenylene ether) resin; (b) greater than or equal to about 20 parts by weight of a polypropylene polymer; (c) greater than or equal to about 5 parts by weight of a styrene-grafted polypropylene polymer; (d) about 20 to about 55 parts by weight of polystyrene resin; and (e) about 0 to about 4 parts of an adhesion promoter; and (f) about 1 to about 20 parts of an amine compound. The adhesion promoter is an organotin compound selected from the group consisting of dibutyltin dilaurate, dibutyltin oxide, and dioctyltin oxide. The amine compound comprises at least one of the class of compounds represented by Formulas (III), (IV), and (V), and polyethyleneimines, as described previously, and secondary amines selected from the group consisting of diethylamine and dipropylamine.

The compositions of the present invention are prepared by mechanically blending the components in conventional mixing equipment, e.g., a single or twin screw extruder, Banbury mixer, or any other conventional melt compounding equipment. A vacuum may also be applied to during the compounding operation to further reduce odorous materials from the composition. The order in which the components of the composition are mixed is not generally critical and may be readily determined by one of skill in this art.

Further understanding of the present invention may be had from the following examples and comparative examples which are intended to illustrate, but not limit, the invention. All cited references are hereby incorporated herein in their entirety.

EXAMPLES

Poly(2,6-dimethyl-1,4-phenylene oxide (abbreviated hereinafter as "2,6-PPE") having an intrinsic viscosity of about 0.4 as measured in chloroform at 25° C. was obtained from GE Plastics. The HIPS sample used in the formulations was Novacor 2272, available from Nova Chemicals. PP homopolymer (PD-403, having a melt flow index of about 1.5 grams/10 minutes at 230° C.) was obtained from Sunoco. Polyethylene amine (E-275) was obtained from Huntsman chemical Company. Cotin 100 (dibutyltin oxide) used as the adhesion promoter) was obtained from CasChem Inc. Interloy P10451 (PS-PP graft copolymer) was obtained from Montell Polyolefin Company. The polyethylene-polyolefin copolymer prepared using metallocene catalyst was also used in some of the compositions. These copolymers are referred to as "m(PE-PO) copolymer". The stabilizer package used is a combination of one or more heat stabilizers, UV stabilizers, primary antioxidants, and secondary antioxidants described previously.

Sixteen resin compositions were prepared by blending together various proportions of 2,6-PPE, HIPS, PP homopolymer, polyethylene amine, and PS-PP graft copolymer. Cotin 100 was added as an optional ingredient to selected resin compositions as indicated in Table 1 below.

General Procedures for Blending/Compounding, Extrusion, and Molding. The specified quantities of the ingredients listed in Table 1 were hand mixed in a bag. Unless otherwise specified, all component quantities are expressed in percent by weight of the resin composition. The resulting mixture was subsequently mixed aggressively with a mechanical blender for uniformity. The uniform mixture was subsequently fed through a feeder and entered into an extruder at the extruder initial entry point. In the instance when the quantity of the PS or HIPS components were each equal to or greater than 10 percent by weight of the total blend weight, the polystyrene or rubber-modified polystyrene components were fed thorough a separate upstream feeder. PP in quantities specified in Table 1 was fed downstream, at approximately barrel 5 of a 10-barrel extruder. Glass fibers, when necessary to be added were fed downstream, at approximately barrel 6 of a 10-barrel extruder.

A 30 millimeter co-rotating twin-screw extruder was used. Blends were melt extruded at about 271° C. and about 450 to about 500 revolutions per minute (rpm), and a throughput rate of about 30 to about 55 pounds per hour. Melt from the extruder was forced through a three-hole die to produce melt strands. These strands were rapidly cooled by passing them through a cold-water bath. The cooled strands were chopped into pellets. Pellets were dried in the oven at about 93° C. for about 2 to about 4 hours.

ASTM parts were molded on a 120-ton molding machine (manufactured by Van Dorn) at about 232 to about 288° C. barrel temperature and about 38 to about 49° C. mold temperature.

Example 1. This Example describes the testing protocol used for evaluating the adhesion of the resin composition to polyurethane foam. A very light coat of food grade grease was applied with a paper towel to all interior surfaces of a foaming mold. The mold contained 12 plaques of the resin composition (prepared as described above), which were held at the bottom of the mold. In a 1000 milliliter plastic disposable beaker was taken 382 grams of Specflex NM815 (a polyol available from Dow Chemical Company). In a separate 250 milliliter disposable beaker, 205 grams of PAPI 95 (a polyisocyanate available from The Dow Chemical Company) was added. Then the polyisocyanate was poured into the polyol, and the contents were quickly mixed with an overhead mechanical stirrer at a stirring speed of about 5,000 rpm for about 10 seconds. Immediately after mixing, the homogeneous mixture was poured into the foaming mold, and a cover was placed on the mold and fastened with four cover clamps. After about 20 minutes the foamed plaques were removed from the mold by taking the mold apart. The plaques with the polyurethane foam on the surface were then conditioned for about 24 hours at room temperature. The samples were then tested for adhesion using the standard method ASTM D 3359A as follows.

Two crosscuts, each about 1.5 inches long that intersect close to their middle are made with a sharp razor blade on the plaques with the polyurethane foam as described above. The minor angle was maintained between 30 and 45 degrees. A pressure sensitive tape was placed at the center of the intersection of the cuts with the tape running in the direction of the smaller angle. The tape was rubbed firmly to ensure good contact adhesion with the foam. Then one of the free ends of the tape was held and moved back upon itself. The cross-cut was inspected and rated in the following manner:

5. No peeling or removal.
4. Trace peeling or removal along incisions.
3. Jagged removal along incisions up to 1/16 in on either side.
2. Jagged removal along incisions up to 1/8 in on either side.
1. Removal of the most of the area of the cross-cut under the tape.
0. Removal beyond the area of the cross-cut The results of the foam adhesion testing are shown in Table 1, where Examples are abbreviated as "Ex". The control formulations of Comparative Examples 2, 12, and 15 show a foam adhesion rating of zero when the polyethylene amine and the organotin adhesion promoter are not used. During the adhesion testing, the polyurethane foam in the plaque of Comparative Examples separate from the substrate. When the formulations contain the polyethylene amine component, EA-275, the foam adhesion rating improves as the amount of EA-275 employed increases, as seen with results obtained with plaques of Examples 3–5, 7–10, 13, and 16. Furthermore, the presence of an organotin compound significantly improves the foam adhesion rating of the formulation at comparable levels of the polyethylene amine component, as seen from comparing data for Examples 4 and 6; Examples 9 and 11, Examples 13 and 14, and Examples 16 and 17. The compositions disclosed herein can be used for making a variety of articles, particularly for the automotive industry.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims. All Patents cited herein are incorporated herein by reference.

TABLE 1

| Ingredients of resin composition | Ex 2* | Ex 3 | Ex 4 | Ex 5 | Ex 6 | Ex 7 | Ex 8 | Ex 9 | Ex 10 | Ex 11 | Ex 12* | Ex 13 | Ex 14 | Ex 15* | Ex 16 | Ex 17 |
|---|---|---|---|---|---|---|---|---|---|---|---|---|---|---|---|---|
| 2,6-PPE | 40 | 39.2 | 38.8 | 38.5 | 38.6 | 39.2 | 38.5 | 37.7 | 37 | 37.6 | 19.4 | 18 | 17.9 | 19.5 | 18 | 17.9 |
| Novacor 2272 | 45 | 44.1 | 43.7 | 43.3 | 43.5 | 34.3 | 33.7 | 33 | 32.4 | 32.9 | 0 | 0 | 0 | 0 | 0 | 0 |
| PD-403 | 10 | 9.8 | 9.7 | 9.6 | 9.7 | 19.6 | 19.2 | 18.9 | 18.5 | 18.8 | 20.5 | 18.9 | 18.9 | 24.5 | 22.6 | 22.5 |
| EA-275 | 0 | 2 | 2.9 | 3.85 | 2.9 | 2 | 3.85 | 5.7 | 7.4 | 5.6 | 0 | 7.4 | 7.4 | 0 | 7.4 | 7.4 |
| Cotin 100 | 0 | 0 | 0 | 0 | 0.48 | 0 | 0 | 0 | 0 | 0.47 | 0 | 0 | 0.46 | 0 | 0 | 0.46 |
| Interloy P10451 | 5 | 4.8 | 4.9 | 4.8 | 4.8 | 4.9 | 4.8 | 4.7 | 4.6 | 4.7 | 0 | 0 | 0 | 0 | 0 | 0 |
| Styrene-diene-styrene block copolymer | | | | | | | | | | | 6 | 5.6 | 5.5 | 6 | 5.6 | 5.5 |
| Hydrogenated styrene-diene-styrene block copolymer | | | | | | | | | | | 8 | 7.4 | 7.4 | 8 | 7.4 | 7.4 |
| Stabilizer package | 0 | 0 | 0 | 0 | 0 | 0 | 0 | 0 | 0 | 0 | 0.25 | 0.23 | 0.23 | 0.2 | 0.19 | 0.18 |
| Crystalline PS | | | | | | | | | | | 29.9 | 27.7 | 27.6 | 29.9 | 27.7 | 27.6 |
| m(PE-PO) copolymer | | | | | | | | | | | 16 | 14.8 | 14.7 | 12 | 11.1 | 11.1 |
| Foam Adhesion rating | 0 | 3 | 4 | 5 | 5 | 1 | 3 | 4 | 5 | 5 | 0 | 4 | 5 | 0 | 4 | 5 |

*Indicates Comparative Examples

What is claimed is:
1. A resin composition comprising:
   (a) about 10 to about 80 percent by weight of at least one polyphenylene ether resin;
   (b) about 10 to about 80 percent by weight of at least one polyolefin polymer;
   (c) about 2 to about 30 percent by weight of at least one member of the group consisting of polyphenylene ether-polyolefin copolymers, polystyrene-polyolefin copolymers, and polystyrene resins;
   (d) about 1 to about 20 percent by weight of at least one alkyl amine compound, wherein said alkyl amine compound comprises at least one of:
      (i) a polyamine having a backbone of the formula:

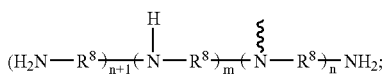

wherein $R^8$ is $C_2$–$C_8$ alkylene, $C_3$–$C_8$ alkyl-substituted alkylene, and mixtures thereof; "m" has a value from 2 to about 700; and "n" has a value from about 0 to about 350;
      (ii) a polyamine having a backbone of the formula:

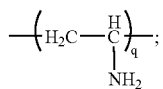

wherein "q" has a value from about 5 to about 10,000;
      (iii) a polyamine compound having backbone NH units, wherein 0% to about 100% of the backbone NH units are substituted by one or more groups of the formula $(R^9O)_pR^{10}$, wherein $R^9$ is $C_2$–$C_8$ alkylene, $C_3$–$C_8$ alkyl substituted alkylene, and mixtures thereof; $R^{10}$ is hydrogen, $C_1$–$C_4$ alkyl, and mixtures thereof; and "p" has values from about 1 to about 12;
      (iv) at least one primary amine selected from the group consisting of cyclohexylamine, 1-hexadecylamine, and a triamine having the formula:

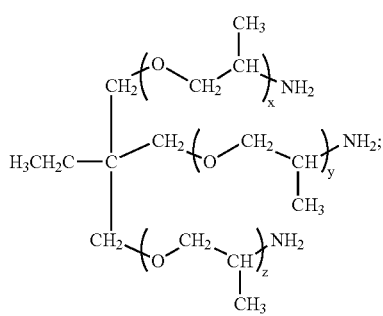

wherein the sum of "x", "y" and "z" is about 3 to about 20; and
      (v) at least one secondary amine selected from the group consisting of diethylamine and dipropylamine; and
   (e) 0 to about 4 percent by weight of at least one adhesion promoter;
   wherein the amount of each component is based upon the total weight of the composition.

2. The resin composition of claim 1, wherein said polyphenylene ether resin is selected from the group consisting of poly(2,6-dimethyl-1,4-phenylene ether), poly(2,3,6-trimethyl-1,4-phenylenelene ether), and poly[(2,6-dimethyl-1,4-phenylene ether-(2,3,6-trimethyl-1,4-phenylene ether)] copolymer.

3. The resin composition of claim 1, wherein said adhesion promoter is an organotin compound.

4. The resin composition of claim 3, wherein said organotin compound is at least one selected from the group consisting of dibutyltin dilaurate, dibutyltin oxide, and dioctyltin oxide.

5. The resin composition of claim 4, wherein said organotin compound is present in about 0.1 to about 4 percent by weight of said resin composition.

6. The resin composition of claim 1, wherein the polyphenylene ether-polyolefin copolymer is selected from the group consisting of polyphenylene ether-polypropylene copolymers, polyphenylene ether-polyethylene copolymers, polyphenylene ether-ethylene propylene copolymers, and any mixture of the foregoing polyphenylene ether-polyolefin copolymers.

7. The resin composition of claim 1, wherein the composition comprises a polystyrene-polyolefin copolymer selected from the group consisting of polystyrene-polypropylene copolymers, styrene-grafted polypropylene graft copolymers, hydrogenated polystyrene-conjugated diene block copolymers, hydrogenated polystyrene-conjugated diene-olefin block copolymers, and any mixture of the foregoing polystyrene-polyolefin copolymers.

8. The resin composition of claim 1, wherein the composition comprises a polystyrene-polyolefin copolymer selected from the group consisting of one or more hydrogenated and non-hydrogenated styrene-butadiene-styrene block copolymers, styrene-isoprene-styrene block copolymers, styrene-ethylene/butylene-styrene block copolymers, styrene-ethylene/propylene-styrene block copolymers, and any mixture of the foregoing polystyrene-polyolefin copolymers.

9. The resin composition of claim 1, wherein the composition comprises a polystyrene resin selected from the group consisting of crystalline polystyrene resins, high flow polystyrene resins, high impact polystyrene resins, and mixtures thereof.

10. The resin composition of claim 1, wherein said polyolefin resin is selected from the group consisting of polypropylene, polyethylene, ethylene-propylene copolymers, ethylene-propylene-nonconjugated diene copolymer, poly(1-butene), poly(1-pentene), poly(4-methylpentene-1,3-methyl-1-butene), poly(1-hexene), poly(3,4-dimethyl-1-butene), poly(1-heptene), poly(3-methyl-1-hexene), poly(1-octene) and mixtures containing any of the foregoing polyolefin resins.

11. The resin composition of claim 1, wherein said polyphenylene ether resin comprises one or more functionalized polyphenylene ether resins that contain at least one moiety selected from the group consisting of amino, epoxy, carboxylic acid, carboxylic ester, ortho ester, anhydride, aliphatic carbon-carbon double bond.

12. The resin composition of claim 1, wherein said polyolefin resin further comprises one or more functionalized polypropylene resins that contain at least one moiety selected from the group consisting of amino, epoxy, carboxylic acid, carboxylic ester, ortho ester, anhydride, aliphatic carbon-carbon double bond.

13. The resin composition of claim 12, wherein said functionalized polypropylene resin comprises polypropylene-graft-maleic anhydride copolymer.

14. The resin composition of claim 1, wherein said resin composition further comprises at least one additive selected from the group consisting of stabilizers, mold release agents, processing aids, flame retardants, drip retardants, nucleating agents, UV absorbers, dyes, pigments, particulate conductive fillers, reinforcing fillers, antioxidants, anti-static agents, blowing agents, and mixtures of the foregoing additives.

15. The resin composition of claim 1 comprising about 20 to about 70 percent by weight of at least one polyolefin polymer.

16. A resin composition comprising:
(a) greater than or equal to about 20 percent by weight of poly(2,6-dimethyl-1,4-phenylene ether) resin;
(b) greater than or equal to about 20 percent by weight of a polypropylene polymer;
(c) greater than or equal to about 5 percent by weight of at least one polystyrene-polyolefin polymer selected from the group consisting of styrene-ethylene-butylene-styrene block copolymer, styrene-butylene-styrene block copolymer, and styrene-grafted polypropylene polymer;
(d) less than or equal to about 10 percent by weight of polypropylene-graft-maleic anhydride copolymer;
(e) about 20 to about 55 percent by weight of polystyrene resin;
(f) 0 to about 4 percent by weight of an organotin adhesion promoter; and
(g) about 1 to about 20 percent by weight of an alkyl amine compound;
wherein the amount of each component is based upon the total weight of the composition; and wherein said alkyl amine compound is at least one selected from the group consisting of a polyethyleneimine, cyclohexylamine, 1-hexadecylamine, diethylamine, dipropylamine, and a triamine having the formula:

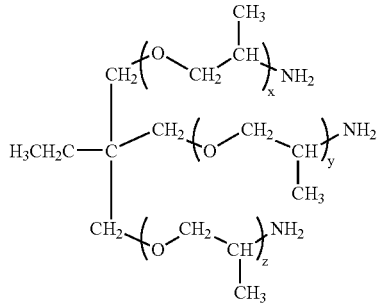

wherein the sum of "x", "y" and "z" is about 5 to about 6.

17. The resin composition of claim 16, wherein said resin composition further comprises at least one additive selected from the group consisting of filler, heat stabilizer, high flow polystyrene resin, primary antioxidant, secondary antioxidant, and UV absorber.

18. A method for improving adhesion between a resin composition and polyurethane foam, wherein said method comprises:
forming said resin composition, wherein said resin composition comprises:

(a) at least one polyphenylene ether resin;
(b) about 10 to about 80 percent by weight of at least one polyolefin polymer;
(c) at least one of (i) a polyphenylene ether-polyolefin copolymer, (ii) a polystyrene-polyolefin polymer, and (iii) a polystyrene resin;
(d) optionally, at least one of a functionalized polystyrene resin and a functionalized polyolefin resin;
(e) 0 to about 4 percent by weight of an adhesion promoter; and
(f) at least one alkyl amine compound, wherein said alkyl amine compound comprises at least one of
  (i) a polyamine having a backbone of the formula:

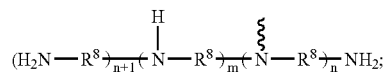

wherein $R^8$ is $C_2$–$C_8$ alkylene, $C_3$–$C_8$ alkyl-substituted alkylene, and mixtures thereof; "m" has a value from from 2 to about 700; and "n" has a value from about 0 to about 350;
  (ii) a polyamine having a backbone of the formula:

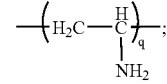

wherein "q" has a value from about 5 to about 10,000;
  (iii) a polyamine, wherein about 0% to about 100% of the backbone NH units are substituted by one or more groups of the formula $(R^9O)_pR^{10}$, wherein $R^9$ is $C_2$–$C_8$ alkylene, $C_3$–$C_8$ alkyl substituted alkylene, and mixtures thereof; $R^{10}$ is hydrogen, $C_1$–$C_4$ alkyl, and mixtures thereof and "p" has values from about 1 to about 12;
  (iv) at least one primary amine selected from the group consisting of cyclohexylamine, 1-hexadecylamine, and a triamine having the formula:

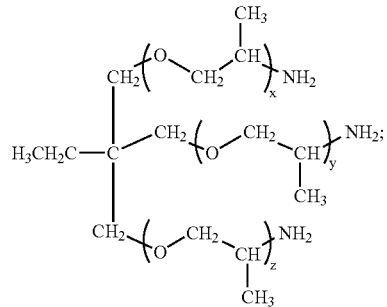

wherein the sum of "x", "y" and "z" is about 3 to about 20; and
  (v) at least one secondary amine selected from the group consisting of diethylamine and dipropylamine; and
contacting said resin composition with a polyurethane foam-forming composition;
wherein the amount of each component is based upon the total weight of the composition; and further wherein said alkyl amine compound is added in an amount that later produces an adhesion strength of greater than or equal to 4, as measured by standard testing method ASTM D 3359A.

19. The method of claim 18, wherein said adhesion promoter is an organotin compound selected from the group consisting of dibutyltin dilaurate, dibutyltin oxide, dioctyltin oxide, and mixtures of the foregoing organotin compounds.

20. The method of claim 18, wherein said polyphenylene ether resin is selected from the group consisting of poly(2,6-dimethyl-1,4-phenylene ether), poly(2,3,6-trimethyl-1,4-phenylenelene ether), and poly[(2,6-dimethyl-1,4-phenylene ether-(2,3,6-trimethyl-1,4-phenylenelene ether)] copolymer.

21. The method of claim 18, wherein said polyphenylene ether-polyolefin copolymer is selected from the group consisting of polyphenylene ether-polypropylene copolymers, polyphenylene ether-polyethylene copolymers, polyphenylene ether-ethylene/propylene copolymers, and any mixture of the foregoing polyphenylene ether-polyolefin copolymers; said polystyrene-polyolefin polymer is selected from the group consisting of polystyrene-polypropylene copolymers, styrene-grafted polypropylene polymers, hydrogenated polystyrene-conjugated diene block copolymers, hydrogenated polystyrene-conjugated diene-olefin block copolymers, and any mixture of the foregoing polystyrene-polyolefin copolymers; and said polystyrene resin is selected from the group consisting of polystyrene resins, high impact polystyrene resins, and any mixture of the foregoing polystyrene resins.

22. The method of claim 18, wherein said polystyrene-polyolefin polymer is selected from styrene-butadiene-butylene-styrene triblock copolymers, styrene-butadiene-styrene block copolymers, and styrene-grafted polypropylene polymers.

23. The method of claim 18, wherein said functionalized polyolefin resin comprises at least one moiety selected from the group consisting of amino, epoxy, carboxylic acid, carboxylic ester, ortho ester, anhydride, aliphatic carbon-carbon double bond.

24. The method of claim 18, wherein said functionalized polystyrene resin comprises at least one moiety selected from the group consisting of amino, epoxy, carboxylic acid, carboxylic ester, ortho ester, anhydride, aliphatic carbon-carbon double bond.

25. The method of claim 18, wherein said functionalized polyolefin resin comprises polypropylene-graft-maleic anhydride copolymer.

26. The method of claim 18, wherein said functionalized polystyrene resin comprises polystyrene-graft-maleic anhydride copolymer.

27. A method for improving adhesion between a resin composition and polyurethane foam, wherein said method comprises:
  forming said resin composition, wherein said resin composition comprises:
  (a) greater than or equal to about 20 percent by weight of poly(2,6-dimethyl-1,4-phenylene ether) resin;
  (b) greater than or equal to about 20 percent by weight of a polypropylene polymer;
  (c) greater than or equal to about 5 percent by weight of at least one polystyrene-polyolefin copolymer selected from styrene-butadiene-butylene-styrene triblock copolymer and styrene-butadiene-styrene block copolymer;
  (d) 0 to about 10 percent by weight of polypropylene-graft-maleic anhydride copolymer
  (e) about 20 to about 55 percent by weight of polystyrene resin; and
  (f) 0 to about 4 percent by weight of an organotin adhesion promoter; and
  (g) about 1 to about 20 percent by weight of an alkyl amine compound; and
  contacting said resin composition with a polyurethane foam-forming composition;
  wherein the amount of each component is based upon the total weight of the composition; and further wherein said alkyl amine compound is added in an amount that later produces an adhesion strength of greater than or equal to 4, as measured by standard testing method ASTM D 3359A.

28. The method of claim 27, wherein said organotin adhesion promoter is an organotin compound selected from the group consisting of dibutyltin dilaurate, dibutyltin oxide, dioctyltin oxide, and mixtures of the foregoing organotin compounds.

29. A resin composition comprising:
  (a) about 10 to about 80 percent by weight of at least one polyphenylene ether resin;
  (b) about 10 to about 80 percent by weight of at least one polyolefin polymer;
  (c) about 10 to about 80 percent by weight polystyrene resin;
  (d) about 1 to about 20 percent by weight of at least one alkyl amine compound, wherein said alkyl amine compound comprises at least one of:
    (i) a polyamine having a backbone of the formula:

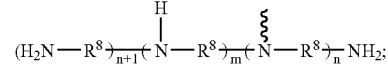

wherein $R^8$ is $C_2$–$C_8$ alkylene, $C_3$–$C_8$ alkyl-substituted alkylene, and mixtures thereof; "m" has a value from 2 to about 700; and "n" has a value from about 0 to about 350;
    (ii) a polyamine having a backbone of the formula:

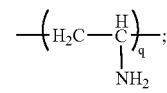

wherein "q" has a value from about 5 to about 10,000;
    (iii) a polyamine compound having backbone NH units, wherein 0% to about 100% of the backbone NH units are substituted by one or more groups of the formula $(R^9O)_pR^{10}$, wherein $R^9$ is $C_2$–$C_8$ alkylene, $C_3$–$C_8$ alkyl substituted alkylene, and mixtures thereof; $R^6$ is hydrogen, $C_1$–$C_4$ alkyl, and mixtures thereof; and "p" has values from about 1 to about 12;
    (iv) at least one primary amine selected from the group consisting of cyclohexylamine, 1-hexadecylamine, and a triamine having the formula:

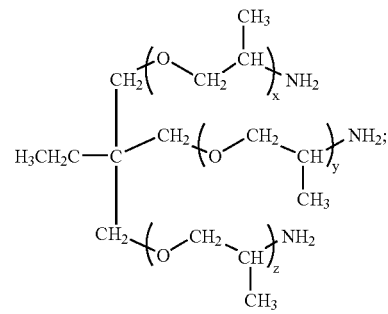

wherein the sum of "x", "y" and "z" is about 3 to about 20; and
    (v) at least one secondary amine selected from the group consisting of diethylamine and dipropylamine; and
  (e) 0 to about 4 percent by weight of at least one adhesion promoter;
  wherein the amount of each component is based upon the total weight of the composition.

* * * * *

UNITED STATES PATENT AND TRADEMARK OFFICE
CERTIFICATE OF CORRECTION

PATENT NO. : 7,214,739 B2
APPLICATION NO. : 10/420974
DATED : May 8, 2007
INVENTOR(S) : Ganesh Kannan et al.

It is certified that error appears in the above-identified patent and that said Letters Patent is hereby corrected as shown below:

Title Page:
Item (75), Inventors, after "Mark Lewis,", delete "Coxsackle" and insert therefor --Coxsackie--;
Item (56), References Cited, Other Publications, after "D. Horn "Polyethyleneimine-Physciochemical Properties and", delete "Applicatins" and insert therefor --Applications--;

Column 2:
Line 3, after "Tanaka", delete "ct" and insert therefor --et--;
Line 10, after "Comprising", delete "specie c" and insert therefor --specific--;
Line 28, after "copolymer", insert --.--;

Column 4:
Line 43, after "$Q^1$", delete ".";

Column 6:
Line 27, after "obtained", insert --.--;

Column 10:
Line 41, before "Primacor®", insert --(--;
Line 53, after "FUSABOND®", delete ", such as";

Column 11:
Line 15, after "can", insert --be--;
Line 53, after "value", delete "from" (2nd occurrence);

Column 12:
Line 2, after "$C_2$", insert -- - --;
Line 5, after "$C_1$ -" delete "$C_{.4}$" and insert therefor --$C_4$--;

Column 13:
Lines 51-52, after "polyurethane", delete "adhesion promoter" (1st occurrence);

Column 14:
Line 53, after "810-tetraoxa-3-9-", delete "diphospaspiro" and insert therefor --diphosphaspiro--;
Line 57, after "(diphenylene)", delete "phosphontic" and insert therefor --phosphonite--;

UNITED STATES PATENT AND TRADEMARK OFFICE
CERTIFICATE OF CORRECTION

PATENT NO.       : 7,214,739 B2
APPLICATION NO.  : 10/420974
DATED            : May 8, 2007
INVENTOR(S)      : Ganesh Kannan et al.

It is certified that error appears in the above-identified patent and that said Letters Patent is hereby corrected as shown below:

Column 15:
Line 9, before "; the Plastistab", delete "$PS_{3005}$" and insert therefor --PS3005--
Line 10, before ",PS4001", delete $PS_{4000}$" and insert therefor --PS4000--

Column 22:
Line 20, after "value", delete "from" (2$^{nd}$ occurrence);
Line 34, after "$C_1$ -", delete "$C._4$" and insert therefor --$C_4$--;

Column 24:
Line 39, after "thereof;", delete "$R^{0}$" and insert therefor --$R^{10}$--.

Signed and Sealed this

Eighth Day of April, 2008

JON W. DUDAS
*Director of the United States Patent and Trademark Office*